United States Patent [19]
Gonda et al.

[11] Patent Number: 4,718,390
[45] Date of Patent: Jan. 12, 1988

[54] FUEL INJECTION TIMING CONTROL METHOD FOR DIESEL ENGINES

[75] Inventors: Tadao Gonda; Tsuneyuki Chiyoda; Keiichi Yamada, all of Higashimatsuyama, Japan

[73] Assignee: Diesel Kiki Co., Ltd., Tokyo, Japan

[21] Appl. No.: 828,831

[22] Filed: Feb. 12, 1986

[30] Foreign Application Priority Data

Feb. 15, 1985 [JP] Japan .................... 60-026573

[51] Int. Cl.⁴ .................... F02M 39/00
[52] U.S. Cl. .................... 123/500; 123/357; 123/489
[58] Field of Search .................... 123/500, 501, 357–359, 123/489, 494

[56] References Cited

U.S. PATENT DOCUMENTS

| 4,530,333 | 7/1985 | Nishimura | 123/489 |
| 4,541,392 | 9/1985 | Ogino | 123/357 |
| 4,542,730 | 9/1985 | Nagasawa | 123/489 |
| 4,561,402 | 12/1985 | Nakano | 123/494 |
| 4,589,279 | 5/1986 | Mitsuyasu | 123/494 |
| 4,590,908 | 5/1986 | Yoshinaga | 123/500 |
| 4,616,621 | 10/1986 | Kuroiwa | 123/494 |

FOREIGN PATENT DOCUMENTS 163130 10/1982 Japan .................... 123/500

Primary Examiner—Carl Stuart Miller
Attorney, Agent, or Firm—Frishauf, Holtz, Goodman & Woodward

[57] ABSTRACT

A fuel injection timing control method for a diesel engine, wherein engine rotational speed and fuel injection quantity as a parameter value indicative of the engine load magnitude are detected. A desired value of the fuel injection timing based upon the detected engine rotational speed and fuel injection quantity is calculated by means of an electronic control unit. An injection timing control device operatively connected to the fuel injection pump of the engine is driven according to the calculated desired fuel injection timing value, so as to minimize the difference between the calculated desired fuel injection timing value and an actual value of the fuel injection timing, by means of the electronic control unit. The fuel injection quantity is detected from the output of an oxygen concentration sensor indicative of oxygen concentration in engine exhaust gases, to thereby precisely detect the engine load magnitude and enable accurate control of the fuel injection timing.

2 Claims, 5 Drawing Figures

FUEL INJECTION TIMING CONTROL METHOD FOR DIESEL ENGINES

BACKGROUND OF THE INVENTION

This invention relates to a fuel injection timing control method for diesel engines, and more particularly to a method of this kind which is capable of accurately controlling the fuel injection timing.

A conventional fuel injection timing control method for diesel engines has been proposed, e.g. by Japanese provisional patent publication (Kokai) No. 57-163130, which comprises detecting the rotational speed of the engine as well as the position of a control rack of a fuel injection pump of the engine as a parameter indicative of engine load, e.g. as a parameter indicative of fuel injection quantity, calculating a desired value of the fuel injection timing based upon the detected rotational speed of the engine and the detected position of the control rack by means of an electronic control unit, and driving an injection timing control device (timer) according to the calculated desired fuel injection timing value, to thereby control the fuel injection timing of the engine.

However, the detection of the control rack position as a parameter indicative of engine load as in the conventional method is not suitable for accurate control of the fuel injection timing: First, the whole stroke through which the control rack is moved is generally rather short, and therefore the position of the controcl rack has to be detected within a small range limited by the short whole stroke of the control rack. As a result, there is a fear that a slight detection error of a sensor for detecting the control rack position can result in greatly degraded precision of the engine load magnitude detection. Thus, it is not desirable to detect the engine load magnitude, e.g. the fuel injection quantity, by detecting the position of the control rack as in the conventonal method. Secondly, due to aging changes such as wear of component parts of the fuel injection pump, and variation of the opening pressure of fuel injection nozzles, actual fuel injection quantity can easily deviate from desired predetermined values which have previously been set as corresponding to respective positions of the control rack, making it impossible to correctly detect the engine load magnitude through detection of the control rack position, and thus resulting in the fuel injection timing being controlled to values inappropriate for actual load conditions of the engine.

SUMMARY OF THE INVENTION

It is the object of the invention to provide a fuel injection timing control method for diesel engines, which is capable of precisely detecting the magnitude of load on the engine, to thereby accurately control the fuel injection timing of the engine.

The present invention provides a method of controlling the timing of fuel injection into a diesel engine having a fuel injection pump, an injection timing control device operatively connected to the fuel injection pump, and an electronic control unit, comprising the steps of: (a) detecting the rotational speed of the engine; (b) detecting a fuel injection quantity supplied to the engine as a parameter value indicative of the magnitude of load on the engine; (c) calculating a desired value of the fuel injection timing based upon the engine rotational speed and the fuel injection quantity thus detected, by means of the electronic control unit; and (d) driving the injection timing control device according to the desired value of the fuel injection timing thus calculated, so as to minimize the difference between the calculated desired value of the fuel injection timing and an actual value of the fuel injection timing, by means of the electronic control unit.

The method according to the invention is characterized in that the engine has an oxygen concentration sensor for detecting oxygen concentration in exhaust gases emitted from the engine, the step (b) comprising detecting the fuel injection quantity from an output of the oxygen concentration sensor indicative of the oxygen concentration.

Preferably, the output of the oxygen concentration sensor varies in linear proportion to a change in the fuel injection quantity.

The above and other objects, features and advantages of the invention will be more apparent from the ensuing detailed description taken in conjunction with the accompanying drawings.

DETAILED DESCRIPTION

The method according to the invention will now be described with reference to the drawings showing an embodiment thereof.

Figure 1:
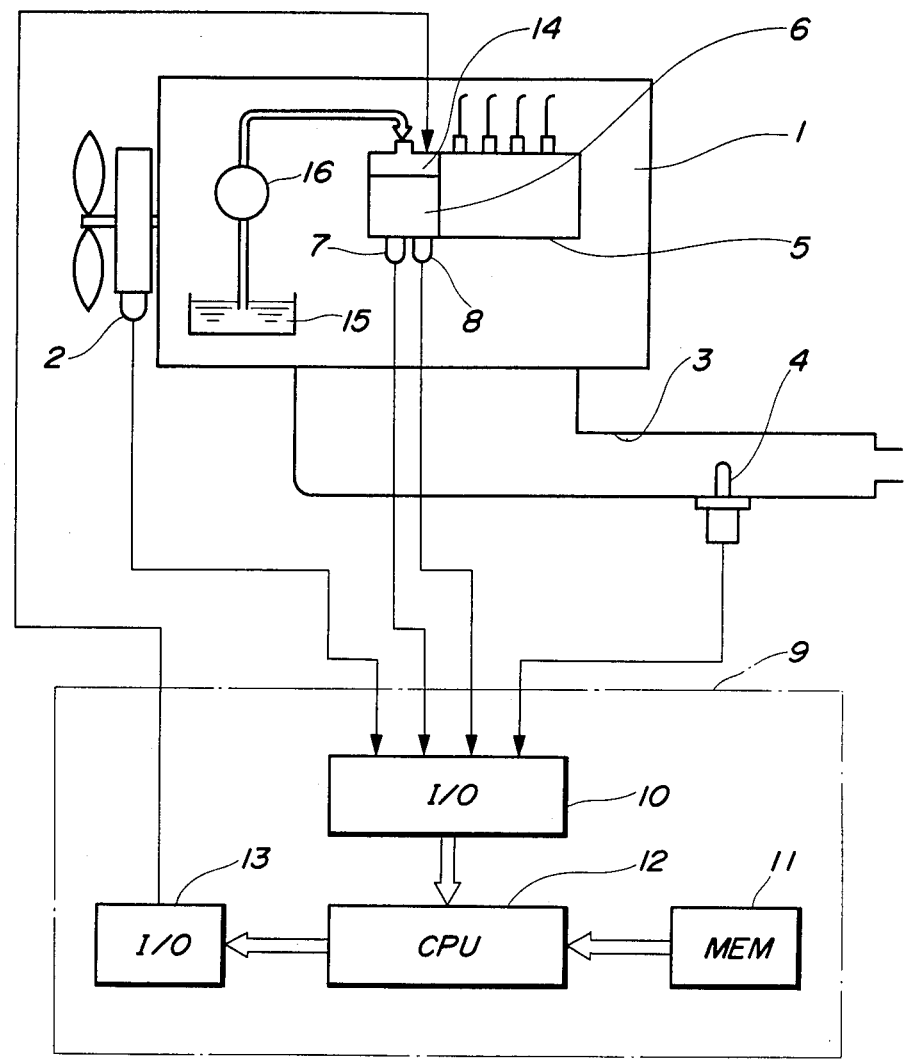
FIG. 1 is a view schematically illustrating an embodiment of the whole arrangement of a fuel injection timing control system of a diesel engine, to which the method according to the invention is applied.
Figure 4:
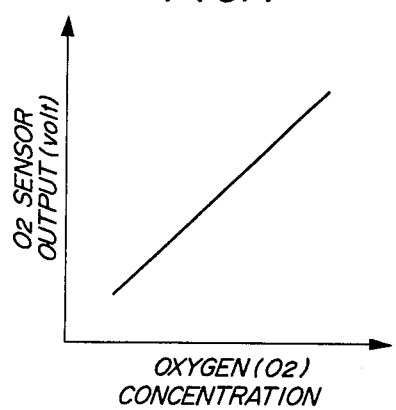
FIG. 4 is a graph showing the relationship between the output of an oxygen concentration sensor such as one appearing in FIG. 1 and the oxygen concentration.

Referring first to FIG. 1, there is shown the whole arrangement of a fuel injection timing control system of a diesel engine, to which the method of the invention is applied. As shown in FIG. 1, a diesel engine, designated by reference numeral 1, is provided with an engine rotational speed (Ne) sensor 2 for detecting the rotational speed Ne of the engine. Further, the engine 1 is provided with an oxygen concentration sensor ($O_2$ sensor) 4 arranged in an exhaust pipe 3 of the engine 1 for detecting oxygen concentration in exhaust gases emitted from the engine 1. As the $O_2$ sensor 4 applicable to the method of the invention, such an $O_2$ sensor of pumping type as disclosed in Japanese provisional patent publication No. 60-14161 may be employed. As shown in FIG. 4, the output of the $O_2$ sensor 4 substantially linearly varies with respect to the fuel injection quantity Q injected by a fuel injection pump 5 of the engine 1. A timer 6 is connected to the fuel injection pump 5 and provided with a rotation sensor 7 for detecting the rotation of an input shaft of the timer 6, and another rotation sensor 8 for detecting the rotation of an output shaft of the timer 6. Incidentally, although the illustrated fuel injection pump 5 is an in-line type, it may be a distributor type.

All electrical signals outputted from the engine rotational speed sensor 2, the $O_2$ sensor 4, the input shaft rotation sensor 7, and the output shaft rotation sensor 8 are supplied to an electric control unit (hereinafter called "the ECU") 9.

The ECU 9 comprises an input interface (I/O) 10 for converting the electrical signals supplied from the above sensors into predetermined data signals, memory means 11 for storing various data such as fuel injection quantity Q for calculating desired fuel injection timing Ta as well as various programs, a central processing unit (hereinafter called "the CPU") 12 operable to read data values from the data stored in the memory means 11, calculate the desired fuel injection timing value Ta in accordance with a predetermined program, and output the resulting control signal, and an output interface (I/O) 13 for converting the control signal from the CPU 12 into a corresponding driving signal.

The timer 6 is provided with an electromagnetic valve 14 which is supplied with pressurized oil from an oil tank 15 through an oil pump 16 during operation of the pump 16, and controlled by the driving signal from the I/O 13 to drive the timer 6.

Figure 3:
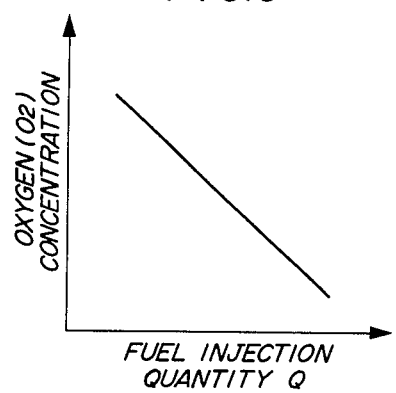
FIG. 3 is a graph showing the relationship between the concentration of oxygen contained in exhaust gases emitted from a diesel engine such as one appearing in FIG. 1 and the fuel injection quantity Q.
Figure 5:
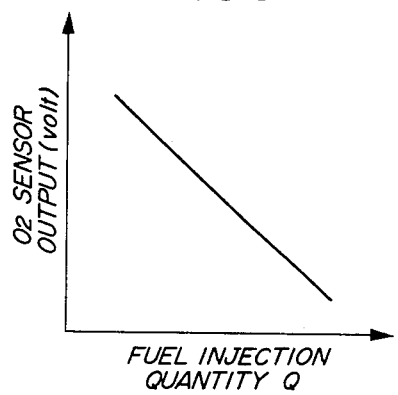
FIG. 5 is a graph showing the relationship between the output of the oxygen concentration sensor and the fuel injection quantity Q.

FIG. 3 shows the relationship between the oxygen concentration in exhaust gases emitted from the engine 1 and the fuel injection quantity Q injected to the engine 1, wherein the former varies in inverse proportion to the latter Q. On the other hand, the relationship between the output of the $O_2$ sensor 4 and the oxygen concentration is shown in FIG. 4, wherein the former varies in direct proportion to the latter. Therefore, the output of the $O_2$ sensor 4, and the fuel injection quantity Q are in the relationship shown in FIG. 5, wherein the output of the $O_2$ sensor 4 varies in inverse proportion to the fuel injection quantity Q, in other words, the former linearly decreases with increase of the latter. Since the fuel injection quantity Q is a parameter indicative of the magnitude of load on the engine 1, the engine load magnitude can therefore be detected from the output of the $O_2$ sensor 4 indicative of oxygen concentration which is in the FIG. 5 relationship with the fuel injection quantity Q.

The memory means 11 stores a fuel injection quantity Q vs. $O_2$ sensor output map, from which the CPU 12 reads a value Q corresponding to an output value of the $O_2$ sensor 4, to calculate a desired value Ta of the fuel injection timing based upon the read fuel injection value Q indicative of the engine load magnitude and the signal value Ne indicative of the engine rotational speed and supplied from the Ne sensor 2. The CPU 12 also operates to determine an actual value Tb of the fuel injection timing from output values of the rotation sensors 7, 8 by detecting the angular phase difference between the input shaft and output shaft of the timer 6 from the two sensor output values.

The CPU 12 supplies a control signal having a value corresponding to the calculated desired fuel injection timing Ta, to the electromagnetic valve 14 of the timer 6 through the output interface 13. The electromagnetic valve 14 operates with a duty ratio corresponding to the driving signal from the output interface 13 corresponding to the control signal to regulate the pressure of pressurized oil supplied from the oil tank 15 through the oil pump 16, so that the timer 6 is driven to adjust the fuel injection timing of the engine 1 in response to the regulated oil pressure.

Figure 2:
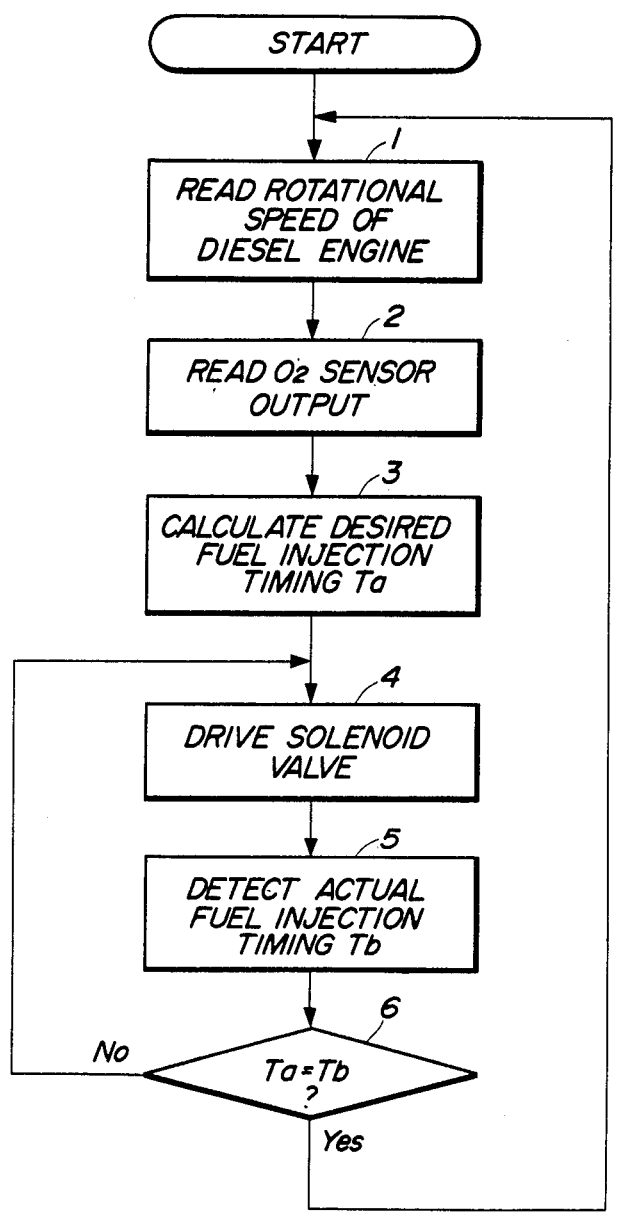
FIG. 2 is a flowchart showing a manner of executing the method of the invention.

Next, the method according to the invention will be described with reference to FIG. 2 showing a control program executed within the CPU 12.

After the start of the engine 1, at respective steps 1, and 2, the rotational speed Ne of the engine 1 and the oxygen concentration detected by the sensors 2, and 4 are read by the CPU 12. Then, at step 3, the CPU calculates a desired value Ta of the fuel injection timing based upon detected values of the engine rotational speed Ne and the oxygen concentration. At step 4, the electromagnetic valve 14 is driven in response to the calculated desired value Ta, so that the timer 6 operates to adjust the fuel injection timing in response to the oil pressure regulated by the valve 14. Then, at step 5, the CPU 12 detects an actual value Tb of the fuel injection timing from output values of the input and output shaft rotation sensors 7, and 8. Then, step 6 is executed to determine whether or not the desired fuel injection timing value Ta and the actual fuel injection timing value Tb are equal to each other.

If the step 6 renders a negative answer, i.e. if the actual fuel injection value Tb is not equal to the desired value Ta, the step 4 is again executed to drive the electromagnetic valve 14 in response to the difference between the values Ta and Tb, and the steps 4–6 are repeatedly executed until it is determined that the actual value Tb has become equal to the desired value Ta at the step 6. On the other hand, if the answer to the step 6 is affirmative, i.e. if the actual fuel injection value Tb is equal to the desired value Ta, execution of the program is terminated and it is again started at the step 1 in the next loop.

As described above, according to the invention, the fuel injection quantity Q as a parameter indicative of engine load is detected from the output of the oxygen ($O_2$) concentration sensor 4 indicative of oxygen concentration in engine exhaust gases, thus enabling precise detection of the fuel injection quantity Q as compared with detection of same from the control rack position as in the conventional method. Further, the fuel injection timing control according to the invention is free from deviation of actual fuel injection timing from desired one attributable to aging changes such as wear of component parts of the fuel injection pump and variation of the opening pressure of fuel injection nozzles, which has been inherent in the conventional method using the control rack cposition as a parameter indicative of the fuel injection quantity, thereby eliminating affects by variations in the control system, and thus enabling accurate control of the fuel injection timing.

What is claimed is:

1. A method of controlling the timing of fuel injection into a diesel engine having a fuel injection pump, an injection timing control device operatively connected to said fuel injection pump, and an electronic control unit, the method comprising the steps of:
  (a) detecting the rotational speed of said engine;
  (b) detecting a fuel injection quantity supplied to said engine as a parameter value indicative of the magnitude of load on said engine;
  (c) calculating a desired value of the fuel injection timing based upon the engine rotational speed and said fuel injection quantity thus detected, by means of said electronic control unit; and
  (d) driving said injection timing control device according to said desired value of the fuel injection timing thus calculated, so as to minimize the difference between said calculated desired value of the fuel injection timing and an actual value of the fuel injection timing, by means of said electronic control unit;

wherein said engine has an oxygen concentration sensor for detecting oxygen concentration in exhaust gases emitted from said engine and for providing an output indicative of said detected oxygen concentration; and said step (b) comprising detecting said fuel injection quantity solely from an output of said oxygen concentration sensor indicative of said oxygen concentration, the output of said oxygen concentration sensor varying in linear proportion to a change in said fuel injection quantity.

2. A method of controlling the timing of fuel injection into a diesel engine having a fuel injection pump, an injection timing control device operatively connected to said fuel injection pump, and an electronic control unit, the method comprising the steps of:
(b) detecting the rotational speed of said engine;
(b) detecting a fuel injection quantity supplied to said engine as a parameter value indicative of the magnitude of load on said engine;
(c) calculating a desired value of the fuel injection timing based upon the engine rotational speed and said fuel injection quantity thus detected, by means of said electronic control unit; and
(d) driving said injection timing control device according to said desired value of the fuel injection timing thus calculated, so as to minimized the difference between said calculated desired value of the fuel injection timing and an actual value of the fuel injection timing, by means of said electronic control unit;

wherein said engine has an oxygen concentration sensor for detecting oxygen concentration in exhaust gases emitted from said engine and for providing an output indicative of said detected oxygen concentration; and said step (b) comprising detecting said fuel injection quantity from an output of said oxygen concentration sensor indicative of said oxygen concentration, the output of said oxygen concentration sensor varying in linear proportion to a change in said fuel injection quantity.

* * * * *